United States Patent Office 3,484,337
Patented Dec. 16, 1969

3,484,337
RUBBER-CONTAINING LAMINATES
Joseph R. Starita, 59 Heller Way,
Upper Montclair, N.J. 07043
No Drawing. Continuation of application Ser. No.
443,702, Mar. 29, 1965. This application July 22,
1968, Ser. No. 753,828
Int. Cl. B32b 7/10, 31/12, 25/08
U.S. Cl. 161—188                                12 Claims

ABSTRACT OF THE DISCLOSURE

A strong bond between rubber and Teflon is achieved by the use of uncured rubber, and a sheet of etched Teflon. The rubber is activated by the use of a mixture of solvents consisting of a hydroxylic solvent, a ketonic solvent, a hydrocarbon and an ionizable substance. The assembly is then heated under pressure to vulcanize the rubber. If a thin sheet of rubber is interposed between Teflon and a metal sheet, and the process applied to the assembly, the resulting bond is superior to other bonds between Teflon and metals.

---

This application is a continuation of my copending application Ser. No. 443,702, filed Mar. 29, 1965, now abandoned.

This invention relates to rubber articles and more particularly to articles in which the rubber is coated with at least one layer of another material, which makes it resistant to a variety of reagents and experimental conditions.

Rubber is used for many articles, for instance, gaskets, packings, valves, diaphragms for pressure regulators, containers for liquids, tank linings, conveyor belts, protective clothing and many other objects in which the porosity, flexibility, feel and tensile strength of rubber, both natural as well as synthetic rubber, are valuable assets.

For many purposes, it is advantageous to cover rubber with a layer of material which is resistant to chemicals, mainly corrosive agents and oxidizing agents, as well as heat and solvents. Polytetrafluoroethylene is the substance preferred in the art for this purpose because of its properties which make it suitable for a variety of applications. For instance, the specific dielectric capacity of polytetrafluoroethylene is very high, close to that of air, so that it may be used in electronic equipment. The physical characteristics, resistance to wetting agents, imperviousness to water and moisture and non-stickiness make polytetrafluoroethylene highly desirable in the food industry, specifically, in sealing films of polyethylene which are used to wrap food packages. Polytetrafluoroethylene is outstanding for its chemical stability, resistance to acids and alkalis, and stability to heat. Polytetrafluoroethylene is also characterized by a low coefficient of friction.

Polytetrafluoroethylene is presently made and sold under the trademark Teflon, a name which will be used hereinbelow for the sake of brevity. By Teflon, is meant the product obtained by polymerizing tetrafluoroethylene in the absence of other unsaturated compounds. The substance, on exposure to heat, sinters at a temperature above 327° C., specifically between 327° and 500° C. Thus Teflon may be used at a temperature, as high as 327° C., for long periods of time, without deterioration. Another advantage of polytetrafluoroethylene is that it remains flexible down to a temperature of −80° C., so that it may be used in a very low temperature range.

In coating rubber with a film or layer of different thickness of Teflon, difficulties have been encountered, mainly because the very properties which make Teflon desirable in a variety of applications, also prevent the formation of a strong bond between Teflon and other materials. Thus, in many cases, it is necessary to manufacture a rubber container, and separately ship a liner made of Teflon, with the inconvenience and additional expense of a separate shipment, because of the impossibility of making Teflon adhere to the rubber. In the case of electrical insulators, they are sold with tapes of Teflon fastened with binders of fiber glass, a method which does not provide the desired degree of intimate adherence. Manifestly, because of the non-adherence to other substances, Teflon has not been utilized to its fullest potentialities and to the best advantage.

Many processes are known in the art to overcome these difficulties, not only with rubber, but also with other articles. For instance, U.S. Patent 2,906,658 teaches a process for coating the surface of Teflon with a codispersion of colloidal fluorocarbon resin, which is preferably a mixture of Teflon itself, and colloidal silica. It is there stated that the codispersion of Teflon and silica, applied to the surface of Teflon, followed by heating to 500°–550° C., modifies the surface and makes the Teflon more cementable with other materials, particularly metals. The process of this patent, in the final step, involves the use of adhesives, for instance epoxy resins and silicone resins. It should be noted that this process involves heating at high temperature, between 500° and 550° C.

In analogy with the above-mentioned patent, most of the processes known in the art involve the use of adhesives. Not only with Teflon, but also with chemically related substances, for instance polytrifluoroethylene, adhesives are still the best means known in the art for bonding the sheet of polymer to another material. By way of illustration, U.S. Patent 2,774,704 describes a process according to which a solvent, such as tetrahydrofuran or dioxane, is used to dissolve the adhesive, for instance vinylidene fluoride. After application onto the polymer, by brushing, or spraying, the solvent is allowed to evaporate, a metal sheet is placed in close contact thereto, and heat and pressure are applied to form a bond.

The two patents U.S. Patent 2,947,325 and U.S. Patent 2,809,130 cover analogous processes, also involving the use of adhesives. The former patent involves dipping the Teflon article into a solution of sodium in liquid ammonia, so as to provide a continuous layer of a chemically activated surface. Then a cementing material or adhesive is applied between the Teflon and the material which is to be bonded to the Teflon. The adhesive is a resin in a suitable solvent, such as xylene or carbon tetrachloride. This process is not designed to provide a strong bond between Teflon and the base material and it is expressely stated that one object of the process is to provide a weak bond, so that the Teflon may be easily separated from the base material.

The process of U.S. Patent 2,809,130 is analogous to the above mentioned process, insofar as it comprises, instead of sodium and liquid ammonia, an alkali metal polyaryl hydrocarbon solvent solution, for instance sodium naphthalene, sodium diphenyl and sodium anthracene to activate the Teflon surface. Here too an adhesive is used, which may be an epoxy resin or a resorcinol formaldehyde resin.

The processes bonding Teflon to other materials, specifically rubber, without foreign substances as adhesives, are scanty and of limited application. Panagrossi, Reissue 24,856, describes a process for bonding Teflon to other materials, which includes the steps of first applying to Teflon a coating of a material which is a composite of Teflon and uncured rubber, then heating to cure the rubber and to fuse the composition to the Teflon, and finally applying uncured rubber and heating under pressure to vulcanize the rubber. The strength of the resulting bond is there stated to be in the range of 3–4 pounds per square inch. While the process of this patent represents an advantage over the processes mentioned above, because no foreign substance as adhesive is required, still the resulting product comprises a body of Teflon having fused to one of its surfaces a layer of both rubber and Teflon, which essentially acts as an adhesive. The limited application of this process is manifest from the low strength of the bond in the finished material.

U.S. Patent 2,764,505 describes a process for the application of a protective sheath of polytetrafluoroethylene to the surface of polysiloxane bodies, that is polymeric substances formed by the heat treatment and curing of highly viscous or semisolid masses of silicone compositions, such as dimethyl polysiloxane and methyl phenyl polysiloxane. The process of this patent comprises coating silicone rubber article with a layer of polytetrafluoroethylene resins, by dipping, brushing, or spraying, then heating at an oven temperature between 720° and 900° F. (380°–480° C.) to cause flash fusion, and finally quenching in cold water. The limited application of this process is manifest from the high temperature required to cause the bond.

The above brief review of the art is sufficient to show that many efforts have been made to bond Teflon to other surfaces, but that a foreign substance as an adhesive is usually essential. Even where no foreign substance is used, the processes known in the art have limited application.

It is an object of the present invention to provide rubber articles with a coating made of Teflon, in which the Teflon is firmly affixed to the rubber. More specifically, the object of this instant invention is to so alter the surface of both rubber and Teflon, that they will enter into chemical combination. In essence, the composition constituting the bond, at the interface between Teflon and rubber, according to the instant invention, is a new chemical compound between rubber and Teflon, rather than merely a bonding between the two surfaces, with both surfaces retaining their identity as in the processes known in the art. Thus one object of this instant invention is to overcome the resistance of Teflon to enter into chemical reaction with other materials, and specifically rubber. In this respect, the instant invention represents a revolutionary advance in an art, where it has been common knowledge that Teflon could not be made to react with other substances.

Another object of the invention is to provide a novel method for bonding Teflon to rubber, which is economical and suitable for large scale application.

Another object of this instant invention is to obviate the use of adhesive and to provide a bond between Teflon and rubber which is stronger than any bonding based on physical forces, that is, a bond which cannot be broken under ordinary conditions, but which can be broken only by decomposing both the rubber and Teflon by application of very high temperature, for prolonged periods of time.

Another object of this invention is to provide a unitary laminated structure which comprises Teflon, rubber and a metal, wherein the metal is bound to the Teflon by a strong and firm bond, because of the interposition of the rubber. Thus, one object of this invention is to insert a very thin core of rubber between Teflon and a metal, for the purpose of providing a firm structure between the three components, without altering the properties of either Teflon or the metal.

Any rubber material, both natural and synthetic, may be used within the scope of the invention. Thus, for instance, there may be used urethane rubbers, nitrile rubbers, that is copolymers of a diene hydrocarbon such as butadiene, and an acrylic nitrile, commercially known as Buna N, or copolymers containing 2-chloro 1,3-butadiene commonly called neoprene or chloroprene. Thiokol rubber, prepared from dihalogenated materials with sodium poly sulfide, polyester rubbers, for instance the polyacrylates, which are copolymers of ethyl acrylate and chloroethyl vinyl ether, polyester amide rubbers, butadiene-styrene copolymers, isobutyleneisoprene copolymers, and silicone rubbers which are siloxane polymers composed of a central chain of alternating silicon and oxygen atoms with alkyl groups attached to the silicon atoms, and chlorinated silicone rubber may also be used. Other synthetic rubbers within the scope of the invention, are the terpolymer from ethylene, propylene and a non-conjugated diene marketed by DuPont under the trademark of Nordel, the chlorosulfonated polyethylene marketed under the trademark of Hypalon, and the copolymer of vinylidene fluoride and hexafluoropropylene, marketed under the trademark of Viton. Sponge rubbers, both natural and synthetic for instance neoprene, and mixtures of natural and synthetic rubbers, may also be used.

The crux of the invention resides in the application of an activating agent to the surface of uncured rubber, depositing a film of Teflon over the activated rubber, and heating the assembly of Teflon and rubber under heat and pressure, until the rubber is vulcanized. The Teflon, within the scope of the invention, is the material commerically available in the form of a sheet, which has been etched by treatment, with an alkali metal, in order to activate the surface. It has been found, surprisingly, that by the use of the etched Teflon and the uncured rubber, previously activated, it is possible in accordance with the process described herein, to form a chemical bond between Teflon and rubber, at a temperature lower than the sintering temperature of Teflon. The activating step for the rubber component comprises treatment of the surface of the uncured rubber with a composition which has a high degree of affinity for the rubber. Manifestly, the composition used to activate the rubber is different, depending upon the sample of uncured rubber. The object of the activating step is to clean the surface of rubber, remove oxidation products, and render the surface of rubber chemically reactive.

It is believed that, during treatment with the activating agent, the terminal chemical groups on the surface of uncured rubber become exposed and ready to enter into chemical reaction. It is also probable that some chemical bonds on the surface of uncured rubber are broken, thus producing a plurality of reactive centers. Although the mechanism of the activation step is not fully known, it is to be understood that the scope of the instant invention is not to be limited by speculation as to the mechanism of the activating step on the uncured rubber.

Broadly, the activating agent comprises a mixture of four different types of organic substances, which will be identified hereinbelow as A, B, C and D. Component A is an hydroxylic substance or a mixture of hydroxylic substances in the proportion between 30 and 70%. More specifically component A, the hydroxylic component, may be methyl, ethyl, propyl, butyl, isobutyl, secondary butyl alcohol or tertiary amyl alcohol. Any substance containing an hydroxyl group, may be used, including heterocyclic and cyclic alcohols, provided that the boiling point is not higher than 130° C. Substituted alcohols, for instance containing an halogen substituent, may also be used. Unsaturated alcohols are less desirable because they may enter into side reactions with the rubber surface. Mixtures of several hydroxylic substances may also be used.

Component B is a carbonyl containing substance, preferably a ketone, rather than an aldehydic substance. Any ketonic substance, of boiling point lower than 105° C., may be used. Dimethyl ketone, diethyl ketone, methyl ethyl ketone, methyl propyl ketone or mixtures of different ketones are satisfactory, provided that the boiling point is not higher than 100°–105° C. Component B is used in the proportion between 0 and 50%.

Component C is an hydrocarbon or a mixture of hydrocarbons of boiling point not exceeding 140° C. Any substance, open-chain, cyclic, aromatic, heterocyclic or substituted may be used, provided the boiling point is within the stated limitation. Benzene, toluene, xylene, hexane, heptane, cyclohexane, petroleum ether of the above stated boiling range, which is a mixture of hydrocarbons, are satisfactorily used. Also pyridine may be used in mixture with other hydrocarbons, if adequate ventilation is provided. Very satisfactory are the halogenated hydrocarbons, such as methyl chloride, methylene dichloride, dichloroethane, dichloropropane and dichlorobutane. Also component C is used in the proportion between 0 and 60%.

Component D is an ionizable substance, in proportion between 0 and 20%. An organic acid, for instance, acetic acid, is satisfactory in the case of urethane rubbers and silicone rubbers. In the case of acrylate-amide rubbers, an organic substance containing an amino or amido group may be used. Also in the case of component D, the choice is limited not only by the composition of the rubber but also by the boiling point, so that only substances with boiling point below 120° C., may be used. A basic substance such as trimethylamine or pyridine may be used, provided adequate ventilation is available for the protection of the worker.

As mentioned above, the choice of each specific substance as component A, B, C and D, and the proportion of each component, are determined by the rubber being used. For instance, in the case of the silicone rubber or urethane rubber, it is advisable to incorporate into the solvent mixture, about 5% of acetic acid to fully accomplish the object of activating the surface. Thus, a satisfactory solvent in the case of silicone rubber comprises about 40–60% of component A, 10–30% of component B, 10–20% of component C and 4–5% of component D, that is, acetic acid. In the case of neoprene (chloroprene), a successful solvent mixture comprises 50–60% of component A, 5–10% of component B and 30–40% of component C. In the case of neoprene, a substantial proportion of component B, the carbonyl-containing reagent, has been found to be more effective. In the case of butyl rubber, a satisfactory solvent mixture comprises 40–50% of component A, which is preferably butyl alcohol, between 30 and 40% of component B, for instance methyl ethyl ketone, and 10 to 20% of component C, for instance trichloroethylene. In the case of natural rubber, a satisfactory solvent mixture comprises 50–70% of component A, for instance butyl alcohol, 10–30% of component B, for instance acetone, 5–10% of component C, for instance toluene. As mentioned above, the choice of each substance is also determined by its boiling point, and the boiling point of the other ingredients of the solvent mixture. For instance if ethanol, of boiling point 78.5° C. is used, rather than butanol which has a boiling point of 116–118° C., then component C may be substantially constituted of the higher-boiling xylene, of boiling point 138°–140° C., rather than benzene, which has a boiling point of 79° to 81° C. If a mixture of substances is used, the choice is also determined by the respective boiling points. Thus, for instance, if xylene is a substantial ingredient of component C, methyl chloride of low boiling point, −24° C., is preferably used in combination with it. If a substantial amount of a substance less volatile than methyl chloride is desired, ethylene dichloride of boiling point 37° C., may be satisfactorily used.

The Teflon film or sheet to be bonded to the rubber, may be of any desired thickness, varying from one thousandth of one inch to as much as desired, according to each specific application, for instance one inch thickness. The solvent mixture is also applied to the Teflon sheet, for the purpose of cleaning the surface. The application to the rubber within the scope of the invention, is conducted by brushing, or spraying, or dipping the rubber article into the solvent mixture. The excess solvent is then allowed to evaporate. The Teflon sheet is deposited onto the rubber, and held firmly in contact with it. The rubber and Teflon assembly is then placed in a mold, of internal contour, size and shape corresponding to the size and shape desired for the final product. If a sheet is desired, the assembly of Teflon and rubber is calendered on pressure rollers. Compression molding and transfer molding may also be used.

The amount of pressure necessary is the pressure ordinarily required to cause vulcanization of rubber, and varies between 5 pounds per square inch to 3000 pounds per square inch, depending on the rubber. Heating under pressure in the mold is conducted at a temperature of 240°–350° F. (122° C.–177° C.) for a period of time varying between 2 minutes and two hours, depending on the thickness of the respective layer of rubber and Teflon and the conditions required to cause vulcanization and curing of each sample of rubber. A reduction in volume occurs during heating, to between 20 to 25% of the original uncompressed volume. In the case of silicone rubber, the heating period varies between 2 minutes and 1 hour. In the case of neoprene and natural rubber, heating is conducted at 150° C. (300° F.), for a period of time between 2 minutes and 2 hours.

If the laminar structure is desired which comprises a metal, for instance, steel, stainless steel, aluminum, iron, and copper base alloys, a rubber sheet and Teflon, the solvent mixture used to activate the rubber, is also applied to the Teflon and to the metal. The rubber sheet is then placed in juxtaposition to the sheet of Teflon and the sheet of metal is placed in contact with the other face of the rubber. The assembly is placed in a metal mold and heated at temperature and pressure required to cause vulcanization of the rubber and formation of a chemical bond in situ between Teflon and the rubber.

The uncured rubber within the scope of the invention, contains the conventional ingredients known to cause vulcanization. Optional ingredients are plasticizers, for instance tricresyl phosphate, butyl benzyl phthalate, dioctyl phthalate, dioctyl azelate, dibutyl phthalate, dioctyl adipate.

For the purpose of better illustrating the invention, the following examples are given hereinbelow but it should be understood that the invention is not limited to the specific embodiments shown in the examples.

EXAMPLE 1

A sheet of Teflon, of thickness 1/1000 in., previously activated by treatment with sodium in an aryl hydrocarbon solvent, or in ammonia to give an etched surface, was sprayed with a solvent mixture comprising 30% dichloroethylene, 5% acetone, 10% benzene, and 55% ethanol. The same solvent mixture, in the same proportions, was used to activate a sheet of uncured chloroprene of thickness 1/8 in. The Teflon-chloroprene assembly was then placed in a metal mold and heated at a temperature of 300° F. and pressure of 2000 pounds per sq. in. for 10 minutes.

The resulting product comprised Teflon and rubber, in a novel combination because it was impossible to separate the two components by the mere application of mechanical force. The chloroprene exhibited all the properties of commercial cured chloroprene. The resulting product is particularly advantageous as diaphragms in pressure regulators, which are used to resist corrosive gases and which act as vapor barriers.

The experiment was repeated with a sheet of chloroprene of thickness 1/8 in. Heating was conducted at 300° F. for 15 minutes. The product was a sheet of chloroprene, coated with Teflon, chemically bonded to the rubber. The bond between rubber and Teflon could not be broken by the application of mechanical force.

If desired, different molds may be used, designed to obtain the final product, in different shapes, for instance with curvatures, with rounded as well as sharp corners, and with undercuts.

EXAMPLE 2

A Teflon sheet as described in Example 1, of thickness ¼ in. was sprayed with a solvent mixture comprising 45% ethanol, 20% methyl chloride, 10% dichloromethane, 10% acetone, 10% of benzene and 5% acetic acid. The same solvent mixture was applied to a sheet of silicone rubber, of thickness ⅛ inch. The silicone rubber and Teflon were placed in juxtaposition with each other, the assembly pressed together, and placed in a metal mold. Heating was conducted at 240° F., for 5 minutes, under 1000 pounds per square inch pressure. The resulting bond could be broken only by heating to temperature sufficient to degrade the rubber.

EXAMPLE 3

Teflon, as described in Examples 1 and 2, of thickness .015 inch, was brushed with a solvent mixture comprising 10% acetone, 30% methyl ethyl ketone, 10% trichloroethylene, 30% butyl alcohol and 20% ethanol. The same solvent mixture was applied onto a sheet of uncured butyl rubber. The Teflon and butyl rubber were placed in juxtaposition, the assembly was placed in a metal mold and heated at 300° F., and 1700 pounds per square inch, for a period of one half hour. In this manner, there was produced a strongly anchored film of Teflon affixed to butyl rubber, which had no cracks, showed no tendency to crack, and could not be stripped off. The resulting Teflon-coated butyl rubber is particularly useful as gaskets, in the chemical industry, because of the impermeability of rubber to fumes and hydrocarbon oils.

EXAMPLE 4

A sheet of chlorosulfonated polyethylene marketed under the trademark of Hypalon, of thickness of 0.045 inch, was sprayed with a solution comprising 20% dichloroethylene, 40% butyl alcohol, 20% ethanol and 20% acetone. The same solvent mixture was used to wash a sheet of Teflon of 0.010 inch thickness. Then a sheet of aluminum, of thickness of 0.25 inch, previously washed with the same solvent mixture, in the same proportions, was placed in contact with the sheet of rubber, and the sheet of Teflon was placed in contact with the other face of the rubber. The assembly was placed in a metal mold for 55 minutes at a temperature of 240° F. and 250 pounds per square inch. The resulting product was a sheet of aluminum, coated with a film of Teflon, with a very thin core of rubber placed therebetween, which gave a stronger bond between the aluminum and Teflon, than by direct contact of aluminum and Teflon. The resulting product is very useful in the food industry, for instance in packaging cold cuts. The polyethylene or nylon films used for wrapping have to be heat-sealed by means of a metal bar. In order to prevent the metal bar from sticking to the polyethylene, the laminate structure comprising aluminum, chlorosulfonated ethylene rubber and Teflon as hereinabove described is very advantageous. This product is also very useful in other applications, because of its dielectric properties, for instance in electronic equipment.

It is manifest from the above description and examples, that the process of this invention resides in a combination of simple steps, which in the manner and in the sequence as described herein, produces the novel result, namely the formation of a new chemical product between Teflon and the rubber. The solvent treatment, as described, with a mixture of different solvents, activates the rubber surface, by exposing reactive groups and producing new reactive centers, with the result that the rubber surface is more suitable for entering into chemical reaction with Teflon. The particular selection of the individual components of the solvent mixture, the proportion of each individual component, the manner and length of heating, under pressure, to cause vulcanization in situ, are all critical factors coacting in producing the novel result.

It is also manifest that in accordance with the process of this instant invention, the heating temperature is kept low, below the sintering temperature of Teflon, and in spite of the relatively mild conditions, it is possible to achieve the formation of a chemical bond between rubber and Teflon.

An outstanding advantage of the present invention is that it provides a method of fabricating rubber articles economically and on a mass production scale, which articles possess excellent properties such as exceptional toughness and flexibility, and are provided with a continuous and tough coating of Teflon that binds itself strongly to the rubber. The laminates produced according to the process of the present invention, have a resistant covering with protection against highly corrosive chemicals such as nitric acid, mixed acid, hydrogen peroxide and anhydrous ammonia.

Some of the important applications of the laminates prepared according to the process of this instant invention are: corrosion-resistant linings for receptacles, a diaphragms subject to high or low temperature, for packaging foodstuffs and in electronic equipment. They are also useful in gaskets and packings.

While only the main objects of the invention have been described and only some examples of carrying out the said invention into practice have been given, it should be understood that the invention is not limited thereto.

What is claimed is:

1. A laminate of superior bonding strength comprising a sheet of aluminum, a sheet of vulcanized chlorosulfonated polyethylene rubber in facewise contact therewith and a sheet of Teflon in juxtaposition to the other face of said polyethylene rubber, said rubber and Teflon being chemically bonded to each other.

2. A method for coating a rubber base selected from the group consisting of natural rubber, synthetic rubber and mixtures thereof, with a continuous film of Teflon chemically bonded to said rubber base, which comprises the steps of:
   (1) applying to said uncured rubber base a solvent mixture having affinity for said rubber base whereby terminal chemical groups are exposed and a plurality of active centers is formed,
   (2) depositing upon said rubber base a sheet of Teflon which has been previously etched and washed with the same solvent mixture,
   (3) heating the assembly of rubber and Teflon at a temperature below the sintering temperature of Teflon, for a period of time between 2 minutes and two hours in confined space, whereby said Teflon and said rubber are compressed into a body of reduced volume, to between 20 and 25% of the original uncompressed volume, in the presence of a vulcanizing agent specific for said rubber, whereby vulcanization of said rubber occurs, in situ, and the Teflon becomes chemically bonded to said rubber.

3. The method according to claim 2 wherein said rubber formulation comprises a plasticizer.

4. The method according to claim 2 wherein said solvent mixture comprises a member A which is at least one hydroxylic solvent of boiling point not higher than 130° C., in proportion between 30 and 70%, a member B which is at least one carbonyl-containing reagent, of boiling point not exceeding 105° C., in proportion between 0 and 50%, a member C which is at least one hydrocarbon of boiling point not exceeding 140° C., in proportion between 0 and 60%, and a member D which is at least one ionizable substance selected from the group consisting of trimethylamine and pyridine, ad an organic acid of boiling point below 120° C., in proportion between 0 and 20%.

5. The method according to claim 4 wherein said uncured rubber is neoprene, and said solvent mixture comprises between 50 and 60% of component A, between 5 and 10% of component B, and between 30 and 40% of component C.

6. The method according to claim 4 wherein said uncured rubber is butyl rubber and said solvent mixture comprises between 40 and 50% of component A, between 30 and 40% of component B, and between 10 and 20% of component C.

7. The method according to claim 4, wherein said uncured rubber is natural rubber, and said solvent mixture comprises between 50 and 60% of component A, between 10 and 30% of component B, and between 5 and 10% of component C.

8. The method according to claim 4 wherein said uncured rubber is chloroprene, said solvent mixture comprises 30% dichloroethylene, 5% acetone, 10% benzene, and 55% ethanol, and said Teflon-chloroprene assembly is heated in a mold at a temperature of 300° F. and pressure of 2000 pounds per square inch for 10 minutes.

9. The method according to claim 4 wherein said uncured rubber is silicone ruber, said solvent mixture comprises 20% methyl chloride, 10% dichloromethane, 10% acetone, 10 benzene, 5% acetic acid and 45% ethanol, and said Teflon-silicone rubber assembly is heated in a mold at a temperature of 240° F. for 5 minutes, under 1000 pounds per square inch of pressure.

10. The method according to claim 4 wherein said uncured rubber is butyl rubber, and said solvent mixture comprises 10% acetone, 30% methyl ethyl ketone, 10% trichloroethylene, 30% butyl alcohol, 20% ethanol, and said Teflon-butyl rubber assembly is heated in a mold at a temperature of 300° F. and 1700 pounds per square inch for a period of one hour.

11. The method according to claim 2 wherein said step 1 is applied separately to (a) said uncured rubber, (b) etched Teflon and (c) to a sheet of metal which is a member selected from the group consisting of aluminum, copper-base alloys and steel, and said sheet of rubber is deposited over one face of said metal prior to step 2, and in step 2 said sheet of Teflon is deposited upon the other face of said rubber and then subjecting said assembly of metal, rubber and Teflon to a temperature of 240° to 350° F. and pressure between 5 and 3000 pounds per square inch in the presence of a vulcanizing agent specific for said rubber, whereby said rubber is vulcanized in situ, at a temperature lower than the sintering temperature of Teflon and a chemical bond is formed between said rubber and Teflon.

12. The method according to claim 11 wherein said uncured rubber is chlorosulfonated polyethylene, said solvent mixture comprises 20% dichloroethylene, 40% butyl alcohol, 20% ethanol and 20% acetone and said metal is aluminum, and said assembly of aluminum, chlorosulfonated polyethylene and Teflon is heated at a temperature of 240° F. under a pressure of 250 pounds per square inch, for 55 minutes.

References Cited

UNITED STATES PATENTS

| Re. 24,856 | 8/1960 | Panagrossi et al. | 161—189 X |
| 2,809,130 | 10/1957 | Rappaport | 161—189 X |
| 3,346,431 | 10/1967 | Hammonds | 161—189 X |
| 3,126,311 | 3/1964 | Fitz Harris | 161—189 X |

FOREIGN PATENTS 1,170,279   1/1959   France.

HAROLD ANSHER, Primary Examiner

J. C. GIL, Assistant Examiner

U.S. Cl. X.R.

156—308; 161—189, 216, 221